United States Patent [19]

Becker

[11] 4,411,440
[45] Oct. 25, 1983

[54] SWINGING CHUCK FOR TURNING MACHINES

[75] Inventor: Wolfgang Becker, Grossbettlingen, Fed. Rep. of Germany

[73] Assignee: Wilhelm Blessing, Nellingen, Fed. Rep. of Germany

[21] Appl. No.: 369,657

[22] Filed: Apr. 19, 1982

Related U.S. Application Data

[63] Continuation of Ser. No. 114,738, Jan. 24, 1980, abandoned.

[30] Foreign Application Priority Data

Jan. 23, 1979 [DE] Fed. Rep. of Germany ....... 2902421

[51] Int. Cl.³ .......................................... B23B 31/18
[52] U.S. Cl. .................................. 279/5; 279/1 DC; 279/4
[58] Field of Search ..................... 279/4, 5, 1 DC, 121

[56] References Cited

U.S. PATENT DOCUMENTS

| 2,732,216 | 1/1956 | Sloan et al. | 279/5 |
| 2,873,822 | 2/1959 | Sloan | 279/5 X |
| 2,948,542 | 8/1960 | Leiper | 279/5 |
| 2,981,962 | 5/1961 | Beckner | 279/5 |
| 3,096,097 | 7/1963 | roddy | 279/5 |
| 3,879,045 | 4/1975 | Beckner | 279/5 X |
| 4,209,181 | 6/1980 | Morawski | 279/5 |

FOREIGN PATENT DOCUMENTS

| 761154 | 9/1980 | U.S.S.R. | 279/5 |
| 780977 | 11/1980 | U.S.S.R. | 279/5 |

Primary Examiner—William R. Briggs
Attorney, Agent, or Firm—Shlesinger, Arkwright, Garvey & Fado

[57] ABSTRACT

A swinging chuck for turning machines such as lathes or the like comprising a chuck body and chuck jaws mounted on radial pivot axes, means for pivoting the chuck jaws around the pivot axes and means for locking the chuck jaws at the desired pivot position, and axially movable actuation means for causing radial reciprocation of the jaws.

22 Claims, 6 Drawing Figures

SWINGING CHUCK FOR TURNING MACHINES

This is a continuation of application Ser. No. 114,738, filed Jan. 24, 1980, now abandoned.

The invention concerns a swinging chuck for turning machines, having a cup-shaped mounting body attached to the spindlehead, in which the chuck jaws, particularly in a two-jaw chuck, are swingable on pivots which run radially with respect to the spindle axis, with the swinging mechanism engaging one of the pivots, whereby the pivot is provided with a hydraulically actuated locking device.

In order to efficiently machine pipe joints or other workpieces which have, for example, elongated sections with intersecting axes, such that two sides are worked on in succession without changing the grip, automatic swinging chucks are known which index automatically while the machine is running. However, known designs have the disadvantage that only one jaw tightens, while the second jaw is designed as a holding bracket and a swing drive acts upon it.

Also known are centrally tightening two-jaw swinging chucks with cantilever-shaped jaws which extend far out from the chuck body. These tend to jam due to relatively high load on the jaw guides, resulting in loss of tightening and gripping force. Further, in the face of the high rotational speeds desired, this jaw design develops centrifugal force problems, primarily due to its weight. Another difficulty is presented in the integrating of the swinging mechanism with jaws specifically that with hydraulic actuation, complex channel systems are necessary. Consequently, most of the known centrally tightening two-jaw swinging chucks are designed only for swinging by hand. This requires the spindle of the machine to be completely stopped for the swinging operation and not restarted until the swing is completed.

A certain known kind of centrally tightening swinging chuck does not have the chuck jaws guided in the chuck body, and opens wide to unload. A feature of this design is a spherical chuck body pivoted on two pivots. This known swinging chuck is very costly, with a complex structure due to the two chuck bodies pivoted one within the other, and therefore is large in diameter. The inertial forces produced during swinging are consequently large; hence such swinging chuck systems are unsuitable for use in machines and machining operations with high rotational speeds.

Swinging chucks of the more commonly used type with only one radially moving jaw have the disadvantage, for example, that differences in the contour of the workpiece cannot be accommodated in centering for the machining. Thus with such a system one is compelled to do the work of inserting shims with the workpiece in order to center it. Another disadvantage of swinging chucks with only one moving jaw is that when inserting the workpiece using a loading device—which is always positioned based on the center of rotation—the workpiece bumps against the non-moving unopened jaw as the former is inserted with a gripping device. When such swinging chucks are used in the machining of pipe joints, differences in wall thickness are produced as a result of large differences in outer diameter in the joints, and these lead to major deviations from the design shape, which can cause significant strength loss. This applied similarly to other workpieces, for example other cast fittings or cast vessels, with which large differences in wall thickness may also occur.

The problem underlying the invention is to device a swinging chuck with which centering errors due to irregular outer workpiece contours or diameters are avoided while keeping the size small and the manufacturing cost low, and ensuring effective transmission of the tightening forces and insensitivity to centrifugal force effects.

For solving this problem it is proposed according to the invention to use an automatic two-jaw swinging chuck in which both jaws are tightened centrally toward the middle. Since it is intended that the jaws be light and that they not project outward, in order that they be insensitive to centrifugal force, and since it is intended that jamming in the jaw guides be avoided in order to ensure good transmission of the tightening forces, two cylindrical jaw pins are provided according to the invention, which are disposed opposite each other in a common pivot axis and which are oppositely moved toward the center via the control means of, for example, a gib-head key rod. The advantage of this is that a resultant point of application of the force on the jaws is exactly at the center of gravity, and further that the jaws are light and thus insensitive to centrifugal force effects. The tightening forces are transmitted well without being taken up in supporting or friction forces as with jaws which project out further. In one advantageous arrangement the forces of the cylindrical jaw pins, which pins are guided radially in the chuck, are absorbed in the chuck body, which surrounds the tightening region in a ring configuration.

The jaw pins guided radially in the chuck body serve at the same time for radial and axial pivoting of the two jaw bases. In this way one jaw base can be connected to the swinging mechanism so as to also engage the swing drive and its locking mechanism apart from the central tightening motion.

For machining pipe joints on two sides, hydraulic rack pistons can be used as swinging mechanisms or swing drives. At each end position these are locked by one or two radial key pistons. The play needed for easy movement of the radial pistons may be compensated by a clamping bushing. Alternatively locking can be accomplished by one or two hydraulically operated tangential key or wedge pistons.

The gib-head key rods are synchronously actuated by a clamping plate. This double-acting clamping plate may be in the form of a two-sided hydraulic piston. The pressure medium is passed at the end of the spindle through an oil manifold with a tube assembly and associated system of channels to the individual cylinder cavities in the chuck body.

The opposite centrally tightening jaw, the one which is not driven by a swinging mechanism but is pivoted to rotate along with driven one jaw and accomplish the clamping of the workpiece, has a ball socket for spherical pivoting of the associated jaw. In the empty condition of the chuck this jaw is not driven via the swinging mechanism, but may be rotationally synchronized by means of a bracket, spring clamp, or other spring device.

If workpiece with intersecting axes are to be accommodated, e.g. fittings, T-unions, cross link assemblies (such as for spigots), or the like, for which, e.g. four 90° swings of six 60° swings are to be carried out during machining, these swings can be realized using, for example, a known stepping system comprising a square (in cross section) swinging pivot and two hydraulic cylinders disposed in the chuck body at 45° to each other in the plane of the square, i.e., coplanar and transverse to the axis of the square bar pivot, containing pistons or plungers which act with pushing edges sequentially on pressure surfaces of the square. In order to avoid reduction of the gripping force of the centrally tightening jaw pins during the tightening process due to friction in the rack, push rod, or locking piston, the hydraulic pressure in these elements may be momentarily reduced during the jaw tightening process.

Different drive means and auxiliary means may be used for actuating the jaw pins in the tightening process, according to the invention. For a larger tightening stroke, a chuck according to the invention may employ an angle lever instead of a gib-head key rod. This angle lever converts the longitudinal stroke produced by the tightening piston into a larger radial stroke for actuating the jaw pins. If necessary, the angle lever may also simultaneously engage a counterweight, for direct compensation of the centrifugal forces of the jaw pins at high rotational speeds.

Other features and advantages of the invention will be seen from the following description, with the aid of the drawings, of example embodiments of centrally tightening swinging chucks.

Figure 1:
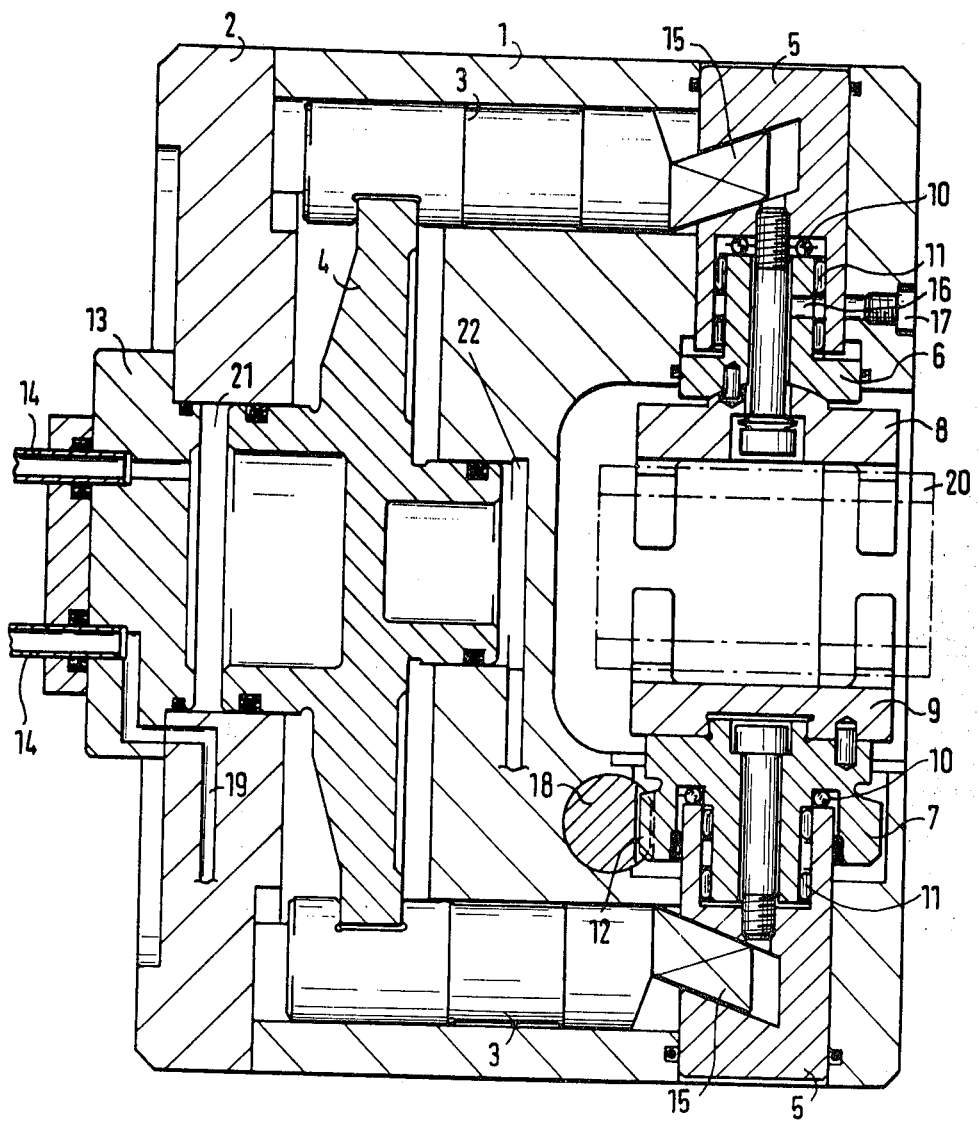
FIG. 1 is a cross sectional view of a centrally tightening tow-jaw swinging chuck according to the invention.
Figure 2:
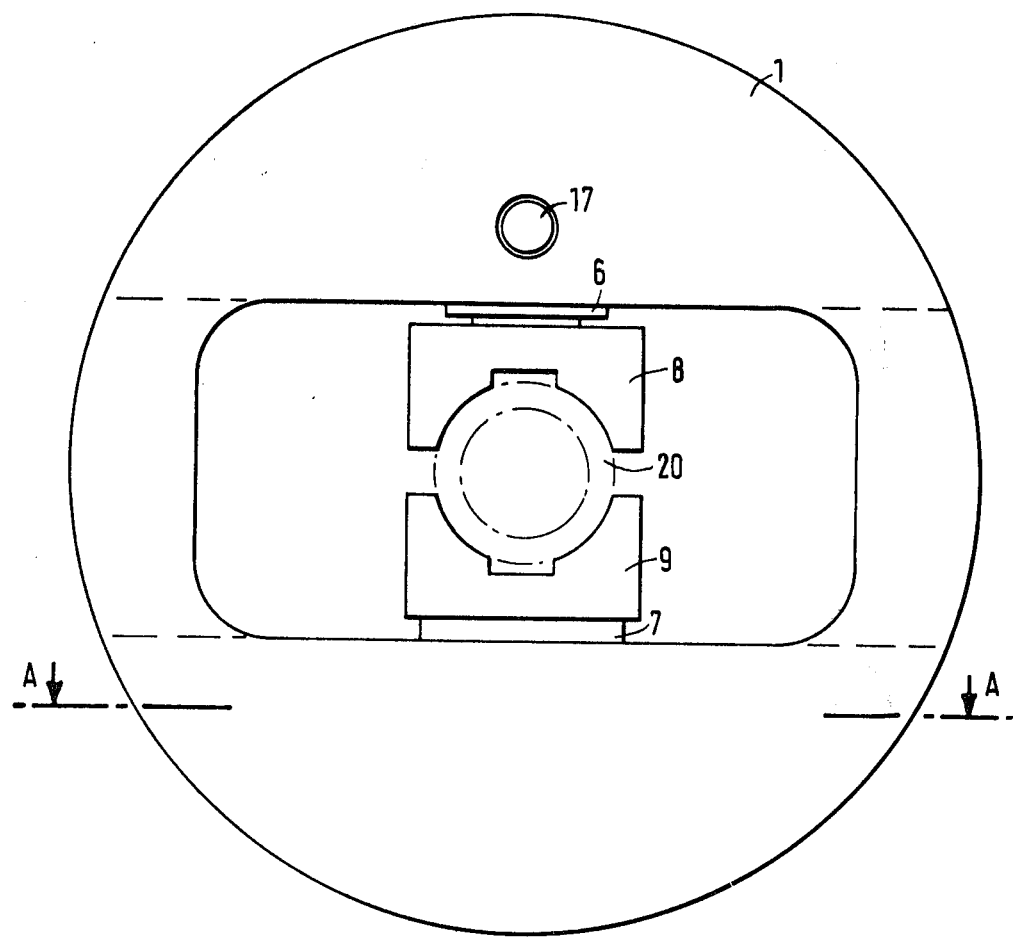
FIG. 2 is a front view of the swinging chuck of FIG. 1.
Figure 4:
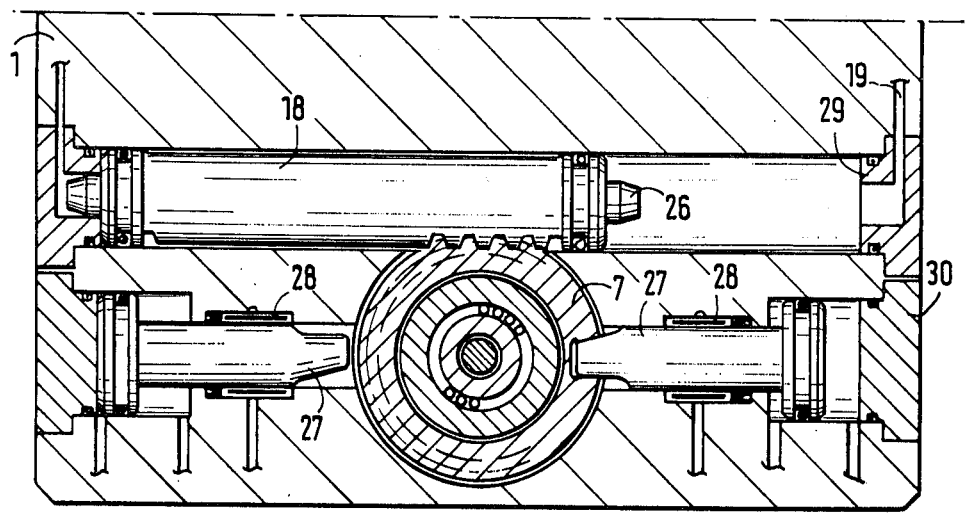
FIG. 4 is a cross section through A—A of FIG. 2.

In FIGS. 1, 2, and 4 a swinging chuck for gripping and machining a pipe joint in two positions, one swing interval or 180° apart, is shown. The swinging chuck comprises a cup-shaped chuck body 1 with a radial base plate 2 by which it is fastened to the holding flange of the machine spindle and by which the tube assembly 14 is connected to the oil manifold 13. Hydraulic oil is passed through channels 19 into cylinder cavities 21 and 22. For tightening, cylinder cavity 21 is acted upon by the fluid, whereby clamping plate 4, which is also the piston, is moved toward the right in FIG. 1.

The outer edge of clamping plate 4 grips a groove in each of the gib-head key rods 3 which are guided in axial channels in the chuck body 1. Plate 4 moves rods 3 to the right and produces, via diagonal keys 15, motion of the cylindrical jaw pins 5 in a direction radial to the rotational axis of the chuck. The rotatable jaw bases 6 and 7 are axially and radially pivoted and supported in holes in jaw pins 5 by means of rollers 11 and balls 10 or the like. The non-driven rotatable jaw base (the upper one in FIG. 1) 6 has a ball socket, as shown in FIG. 1, for spherical pivoting of a gripping jaw 8, in order to adjust to and compensate for possible deviations or defects in the gripping diameter of the workpiece 20.

The lower gripping jaw 9 is connected to the rotatable lower jaw base 7. When the machining of the first side of workpiece 20 is completed, one of the two locking pistons 27 (see FIG. 4) is driven out of the keyway of rotatable jaw base 7, as clamping bushing 28 is released. Now the swinging process can begin by fluid acting upon one piston face of rack piston 18, via channel 19, whereby the rack teeth of the piston mesh with the gaps in the teeth of the rotatable jaw base 7. To stabilize the swung mass in each of the end positions, after completion of the respective swinging process, the rack piston 18 is provided on both sides with end position stabilizing and damping means 26 (FIG. 4). Also after completion of the swing a locking piston 27 is pushed in to engage the locking groove of the rotatable jaw base 7. Clamping bushing 28 then is actuated to remove any play in the piston rods, following which the machining of the second side of the workpiece can begin. It may be provided for both locking pistons 27 to simultaneously be moved in and engage corresponding grooves in jaw base 7, and for this to occur in each of the swing positions.

Figure 3:
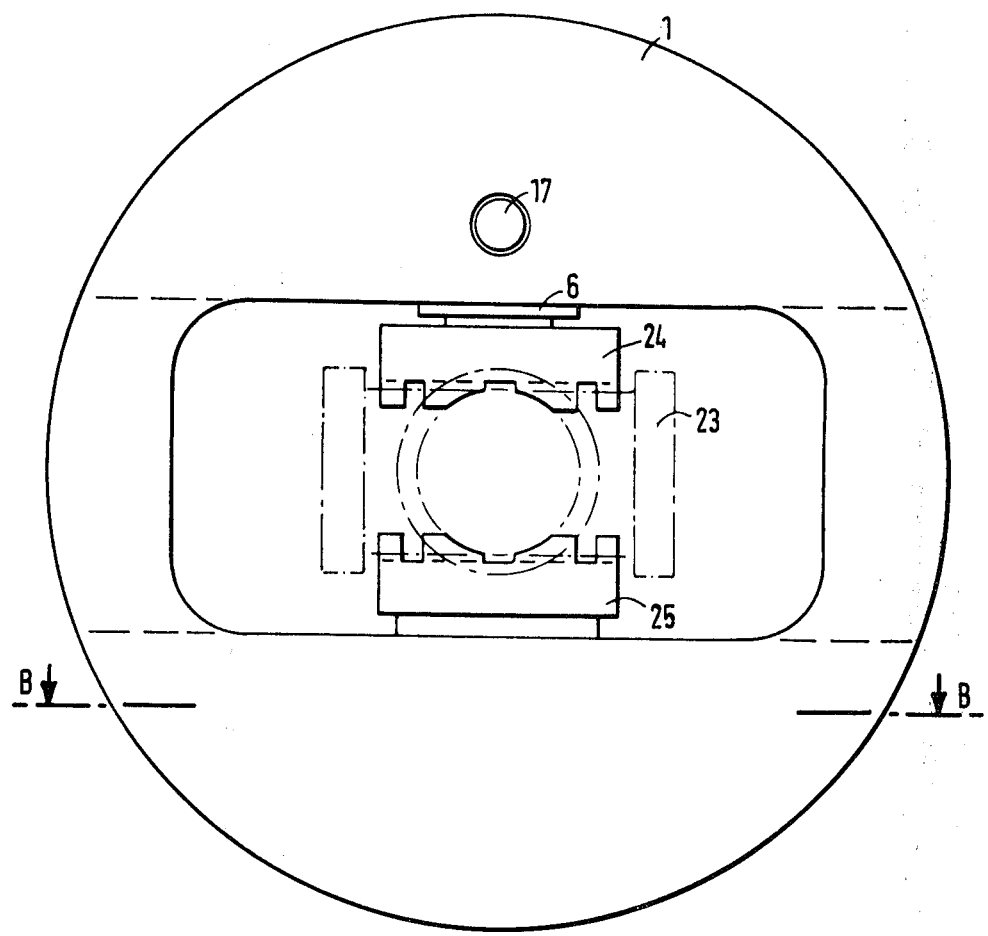
FIG. 3 is a front view of a swinging chuck similar to the chuck of FIG. 2 but with a piston stepping mechanism for swinging the gripping jaws.
Figure 5:
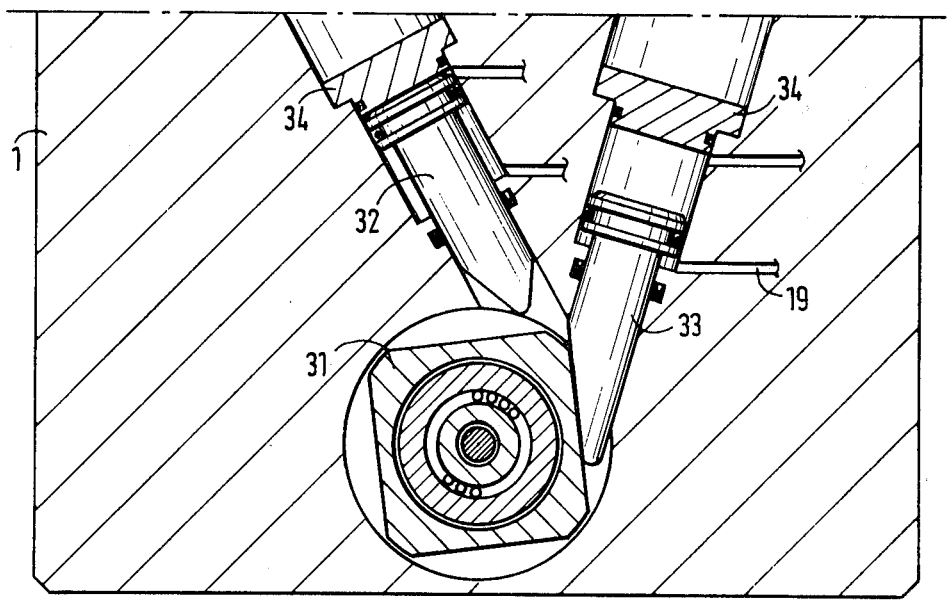
FIG. 5 is a cross section through A-B of FIG. 3.

FIGS. 3 and 5 show an embodiment of a swinging chuck for gripping and machining three-way or four-way fittings 23. The central tightening mechanism is basically the same as shown in FIG. 1, but the design of the jaws 24 and 25 is adapted to the workpiece. The swinging mechanism is altered so that instead of two 180° steps being executed by the action of the rack piston 18, there are continual double 45° steps (=90°) executed with the aid of a corresponding step mechanism such as the one shown in FIG. 5. Here the locking push rod 33 operates first, being actuated by fluid through channel 19 so that it retracts, whereup alternately locking push rod 32 further moves square cross section member 31 of the lower jaw base, by acting on one of the four outer faces of member 31. Continuing the sequence, piston 32 retracts again, allowing locking piston 33 to act to accomplish a force-locking tangential lock against square member 31 of the rotatable jaw base.

In order to combat the effect of friction or twisting which may diminish the gripping force during the tightening process, the locking piston 32 and 33 or the rack piston 18 and locking pistons 28 may be briefly released from the hydraulic pressure during the tightening.

Figure 6:
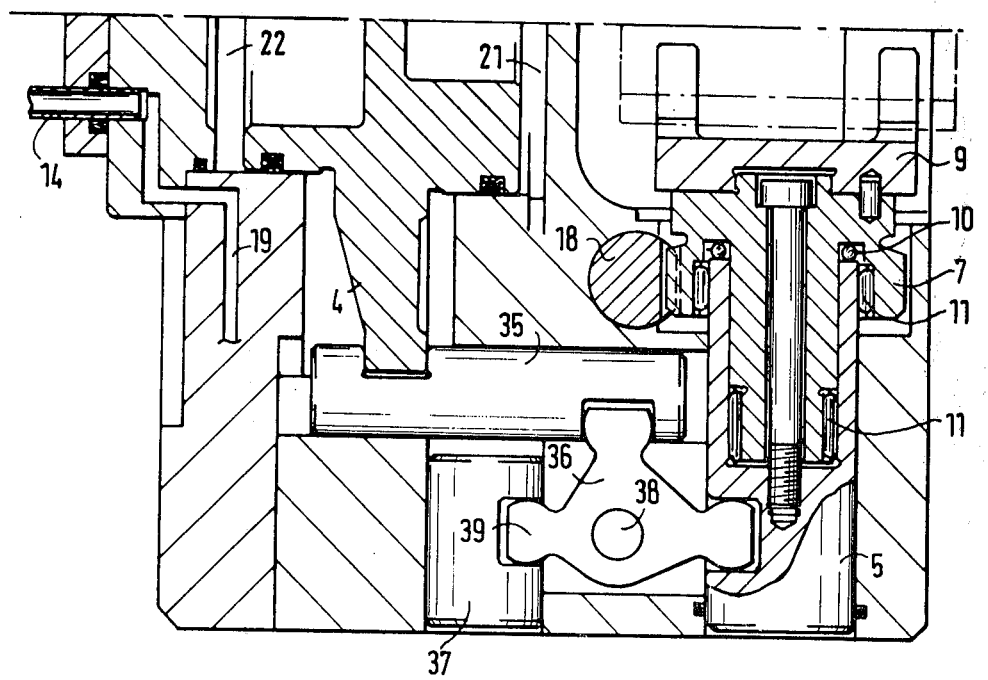
FIG. 6 is a partial longitudinal cross sectional view similar to the view in FIG. 1, but of a different embodiment.

In the embodiment of swinging chuck according to the invention which is shown in FIG. 6, thrust bars 35 are provided instead of the gib-head key rods as the connection between the clamping plate 4 and the jaw pins 5 in the axial direction in the chuck body 1, whereby the outer edge of clamping plate 4 engages grooves in these thrust base 35. In their outer end regions, bars 35 are bendably linked to respective angle levers 36 which are swingably mounted to pivot around axes 38 in the chuck body. The outer end of each lever 36, preferably at a 90° angle from the first, is linked as shown to the associated jaw pin 5 so as to produce the latter's radial displacement for clamping. The tightening force is thus transferred from clamping plate 4 through thrust bars 35 to the jaw pins 5.

Angle lever 36 can have three legs, as shown in FIG. 6, with the additional leg 39 engaging a groove in a counterweight 37, to compensate centrifugal forces acting on its associated jaw pin 5, particularly at high rotational speeds. The embodiment with the angle lever offers a larger tightening stroke than the one with the gib-head key rods.

I claim:

1. A work piece gripping chuck for use on turning machines, comprising:
   a. a cup-shaped body having a continuous cylindrical periphery wherein said body is adapted to be mounted on and for co-rotation with a machine spindle and wherein said body includes a pair of diametrically opposed radial bores;

b. a pair of diametrically opposed, radially extending clamping jaws mounted in said body for radial reciprocation towards and away from each other as a means for gripping and releasing a work piece and wherein each of said jaws includes a cylindrical jaw pin slideably guided in said radial bores;

c. a clamping plate centrally positioned in said chuck body and guided for axial translational movement;

d. a pair of parallel accuating bars axially reciprocal in said body and connected to said plate;

e. means for coupling each of said accuating bars to a respective clamping jaw and means for converting common horizontal movement of said accuating bars into radial movement of said jaws, wherein said coupling means and said converting means engage each of said jaw pins respectively intermediate of their end portions guided in said radial bores, and wherein further each of said clamping jaws further comprises jaw bases including a central spindle portion rotatably mounted within a hollow radial inner end of each of said jaw pins respectively; and, f. drive means for rotating said clamping jaws about an axis of radial reciprocation and means for locking said drive means in position wherein said jaw bases have a peripheral portion surrounding said radial inner end of said jaw pins respectively and in driving engagement with said rotating means.

2. A swinging chuck according to claim 1, characterized in that the common drive means has an axially translatable clamping plate (4) which is centrally positioned within the chuck body (1) and which is linked to the jaw pins (5) via force-redirecting devices which convert the axial driving force of the clamping plate onto a radially acting actuating force for the jaw pins.

3. A swinging chuck according to claim 2, characterized in that the clamping plate (4) is designed to act as a double-sided hydraulic piston within the chuck body, and is actuatable by fluid from hydraulic connections (19) running through a spindlehead and into the chuck body (1).

4. A swinging chuck according to claim 2, characterized in that the force-redirecting devices comprise gib-head key rods (3) connected to the clamping plate (4), which key rods are guided in axial channels in the chuck body (1) and which have projections which engage correspond key grooves in the jaw pins (5).

5. A work piece gripping chuck for use on turning machines as defined in claim 1, wherein:

a. said means for rotating a jaw base includes an hydraulic motor and wherein further said motor acts at said jaw base perimeter.

6. A work piece gripping chuck for use on turning machines as defined in claim 5, wherein:

a. said perimeter is a part of said hydraulic motor; and, b. said motor is housed in a housing inside said chuck body.

7. A work piece gripping chuck for use on turning machines as defined in claim 1, wherein:

a. said rotating means comprises an hydraulic cylinder having a rack piston; and, b. said piston engages said jaw base perimeter.

8. A work piece gripping chuck for use on turning machines as defined in claim 1, wherein:

a. said coupling means comprises jib-head keys at one end of said accuating bars; and, b. corresponding key grooves being in continuous engagement with said keys at a position intermediate of the ends of each of said jaw pins respectively.

9. A work piece gripping chuck for use on turning machines as defined in claim 1, further comprising:

a. two angle levers;

b. means of coupling said clamping plate to said angle levers; and, c. said levers include a drive connection intermediate the end of said jaw pins respectively.

10. A work piece gripping chuck for use on turning machines as defined in claim 5, further comprising:

a. a ball socket at the radial inner end of the jaw base not in driving engagement; and, b. said ball socket acting as a spherical bearing surface for accomodating a correspondingly shaped surface of a gripping jaw.

11. A swinging chuck according to claim 1 characterized in that the jaw bases are swingably linked to respective jaw pins (5) with which they act in concert, while said jaw bases are secured against axial separating movement.

12. A swinging chuck according to claim 1 characterized in that the jaw pins (5) are guided in radial bores which are accessible from outside the chuck body (1).

13. A swinging chuck according to claim 1 characterized in that the rotating means, which acts at the perimeter of one of the jaw bases (7), is lockable by at least one key-type or wedge-type locking device which acts on the part of the jaw base which is used for rotating the jaw bases.

14. A swinging chuck according to claim 1, characterized in that the means for rotation the one jaw base (7) comprises a rotating hydraulic motor.

15. A swinging chuck according to claim 14, characterized in that the hydraulic motor has a direct drive linkage to a geared perimeter of the jaw base (7), via a rack piston (18).

16. A swinging chuck according to claim 14, characterized in that the perimeter of the jaw base is a part of the hydraulic motor, which is housed in a motor housing inside said chuck body.

17. A swinging jaw chuck for turning machines comprising a substantially cylindrical body, a pair of oppositely disposed clamping jaws for centrally clamping a workpiece, said clamping jaws comprising radially guided cylindrical jaw pins, force converting means engaging each of said jaw pins, a common drive means acting on said drive pins through said force converting means whereby said drive means acts along the longitudinal axis of said body and said force converting means converts the longitudinal force to a radial force on said jaw pins, said jaw pins being mounted in radially disposed cylindrical openings in said body, means for rotating one of said clamping jaws about a radial axis and means for locking said jaw in position, said rotating and locking means being radially inwardly of said force converting means in said body, and said clamping jaws further comprising jaw bases, one of said jaw bases being radially mounted on one of said jaw pins and being engageable by said rotating and locking means, said common drive means including an axially translatable clamping plate centrally positioned in said chuck body and linked to said jaw pins by said force converting means, said force converting means comprising two angle levers each having a drive connection to one of said jaw pins.

18. A swinging chuck according to claim 17, characterized in that the clamping plate (4) is connected to each of the angle levers (36) at one leg of the angle lever, via an axial thurst bar (35), whereby said angle levers are swingably mounted in the chuck body and are linked, via another of their legs, to the jaw pins (5), for radial displacement of said pins.

19. A swinging chuck according to claim 18, characterized in that each angle lever (36) has three legs, whereby one leg is indirectly connected to the clamping plate (4), the second leg is pivotally linked to the corresponding jaw pin (5), and the third leg (39) is connected to a counterweight (37) which is guided in the chuck body (1), to compensate centrifugal forces acting on the jaw pin (5).

20. A swinging chuck according to claim 18, characterized in that the jaw pins (5) are cylindrical and have a central bore in which the pivots of their respective jaw bases (6 and 7) are accommodated and are rotatably mounted.

21. A swinging chuck according to claim 20, characterized in that the jaw bases (6 and 7) each have a shoulder which encroaches and engages the respective jaw pin (5) in a radially outward direction from the jaw base, which shoulder is rotatably mounted and supported at the perimeter of the jaw pin, for pivotal mounting the jaw base.

22. A swinging chuck according to claim 21, characterized in that the swinging mechansim (18, 32 and 33) acts at the outer perimeter of the edge section of one of the jaw bases (7), which in turn outwardly encroaches and engages its respective jaw pin (5).

* * * * *